(12) United States Patent
Hatta et al.

(10) Patent No.: US 11,027,459 B2
(45) Date of Patent: Jun. 8, 2021

(54) FUEL TANK PRODUCING APPARATUS

(71) Applicants: Ken Hatta, Okazaki (JP); Yasuhiro Sasaki, Osaka (JP)

(72) Inventors: Ken Hatta, Okazaki (JP); Yasuhiro Sasaki, Osaka (JP)

(73) Assignees: TOYOTA JIDOSHA KABUSHIKI KAISHA, Toyota (JP); KOYO THERMO SYSTEMS CO., LTD., Tenri (JP)

( * ) Notice: Subject to any disclaimer, the term of this patent is extended or adjusted under 35 U.S.C. 154(b) by 259 days.

(21) Appl. No.: 15/911,631

(22) Filed: Mar. 5, 2018

(65) Prior Publication Data

US 2018/0281240 A1 Oct. 4, 2018

(30) Foreign Application Priority Data

Mar. 31, 2017 (JP) ................................ 2017-070086

(51) Int. Cl.
*F27B 13/06* (2006.01)
*B29C 35/04* (2006.01)
*B29C 35/00* (2006.01)
*B29L 31/00* (2006.01)
(Continued)

(52) U.S. Cl.
CPC .......... *B29C 35/045* (2013.01); *B29C 35/002* (2013.01); *B29C 2035/046* (2013.01); *B29K 2101/10* (2013.01); *B29K 2307/04* (2013.01); *B29L 2031/7172* (2013.01)

(58) Field of Classification Search
CPC ....... B29C 70/446; B29C 70/28; B29C 49/22; B29C 48/0017; B29B 13/024; B29B 13/025; F27B 13/06; F27B 15/02
See application file for complete search history.

(56) References Cited

U.S. PATENT DOCUMENTS 2,897,545 A * 8/1959 Meissner ............. B29B 13/024
264/311
4,023,257 A * 5/1977 Wright ................... B29C 41/04
29/460

(Continued)

FOREIGN PATENT DOCUMENTS

EP 0 253 547 A1 1/1988
JP 2010-264718 A 11/2010
(Continued)

*Primary Examiner* — Gregory A Wilson
(74) *Attorney, Agent, or Firm* — Oliff PLC

(57) ABSTRACT

Provided is a fuel tank producing apparatus capable of uniformly heating a tank container in a short period of time. The fuel tank producing apparatus includes a heat curing furnace for heating the tank container and a hot air generator for generating hot air. The heat curing furnace is internally provided with a nozzle for blowing the hot air onto the surface of the tank container, and externally provided with a rotating portion for rotating the tank container about the central axis thereof. The nozzle is located at a position displaced to the left relative to the vertical direction to the central axis of the tank container as viewed from the direction of the central axis of the tank container. The rotating portion is configured to rotate the tank container in the reverse direction of a direction in which the hot air is blown from the nozzle.

8 Claims, 7 Drawing Sheets

(51) Int. Cl.
*B29K 101/10* (2006.01)
*B29K 307/04* (2006.01)

(56) References Cited

U.S. PATENT DOCUMENTS

| | | | | |
|---|---|---|---|---|
| 4,584,041 | A * | 4/1986 | Lyman | B29D 22/003 |
| | | | | 156/156 |
| 6,491,180 | B2 * | 12/2002 | Distelhoff | B60K 15/03177 |
| | | | | 220/4.14 |
| 6,540,955 | B1 * | 4/2003 | Hutchinson | B29B 13/025 |
| | | | | 264/230 |
| 8,220,130 | B2 * | 7/2012 | Robbins | B65D 88/06 |
| | | | | 220/560.03 |
| 2013/0092311 | A1 | 4/2013 | Kobayashi | |

FOREIGN PATENT DOCUMENTS

| | | | |
|---|---|---|---|
| JP | 2010264718 A | * | 11/2010 |
| WO | 2013/057753 A1 | | 4/2013 |

* cited by examiner

FUEL TANK PRODUCING APPARATUS

CROSS REFERENCE TO RELATED APPLICATIONS

The present application claims priority from Japanese patent application JP2017-070086 filed on Mar. 31, 2017, the content of which is hereby incorporated by reference into this application.

BACKGROUND

Technical Field

The present disclosure relates to a fuel tank producing apparatus.

Background Art

Fuel tanks, such as a hydrogen tank, mounted on fuel-cell and hydrogen vehicles and the like are required to have enough strength to resist a high pressure and to be lightweight. As a method for producing such fuel tanks, there is known a method that includes preparing a tank container by repeatedly winding carbon fibers impregnated with a thermosetting resin such as an epoxy resin around the surface of a cylindrical liner while rotating the cylindrical liner and then thermally curing the thermosetting resin (that is, a filament winding method).

Examples of a fuel tank producing apparatus suitable for performing the aforementioned producing method include such an apparatus as the one described in JP 2010-264718 A that includes a rotating portion for rotating a tank container about the central axis thereof, a heat curing furnace for heating the entire tank container, and an air bubble removing portion for removing air bubbles generated on the surface of the tank container due to local heating. According to the fuel tank producing apparatus with such a configuration, removal of air bubbles through blowing of hot air by means of the air bubble removing portion can prevent the dimensions and design of the tank from being affected by the air bubbles.

SUMMARY

However, in the aforementioned fuel tank producing apparatus, there has been a problem in that it takes time to heat the tank container because the heating on the tank container is performed by the surrounding ambient temperature of the tank container. Further, there has been another problem in that only through local heating with the use of a nozzle, the tank container cannot be uniformly heated.

The present disclosure has been made in view of such technical problems, and provides a fuel tank producing apparatus capable of uniformly heating a tank container in a short period of time.

The fuel tank producing apparatus according to the present disclosure includes a rotating portion for rotating a tank container about the central axis thereof and a nozzle for blowing gas onto the surface of the tank container, the rotating portion being adapted to rotate the tank container in the reverse direction of a direction in which the gas is blown from the nozzle, the nozzle being located at a position displaced relative to the vertical direction to the central axis of the tank container as viewed from the central axis direction of the tank container.

In the fuel tank producing apparatus according to the present disclosure, since the rotating portion is adapted to rotate the tank container in the reverse direction of a direction in which gas is blown from the nozzle, the tank container maintains its contact with the gas blown from the nozzle for a long period of time, so that the thermal efficiency can be improved. In addition, since the nozzle is located at a position displaced relative to the vertical direction to the central axis of the tank container as viewed from the central axis direction of the tank container, the gas blown from the nozzle is allowed to flow in one direction along the tank perimeter, so that the thermal efficiency can be improved. As a result, the tank container can be uniformly heated in a short period of time.

Further, in the fuel tank producing apparatus according to the present disclosure, the nozzle extends along the central axis direction of the tank container, and an injection port thereof is preferably seamlessly formed along the central axis direction of the tank container. With such a configuration, the tank container can be uniformly heated.

Furthermore, in the fuel tank producing apparatus according to the present disclosure, it is preferable to further include a heating portion for heating a mouthpiece portion provided at an end in the central axis direction of the tank container. With such a configuration, using the thermal conductivity of the mouthpiece portion, the tank container can also be heated from the inside thereof, so that the time needed for the heating can be further reduced.

According to the present disclosure, a tank container can be uniformly heated in a short period of time.

DETAILED DESCRIPTION

Figure 1:
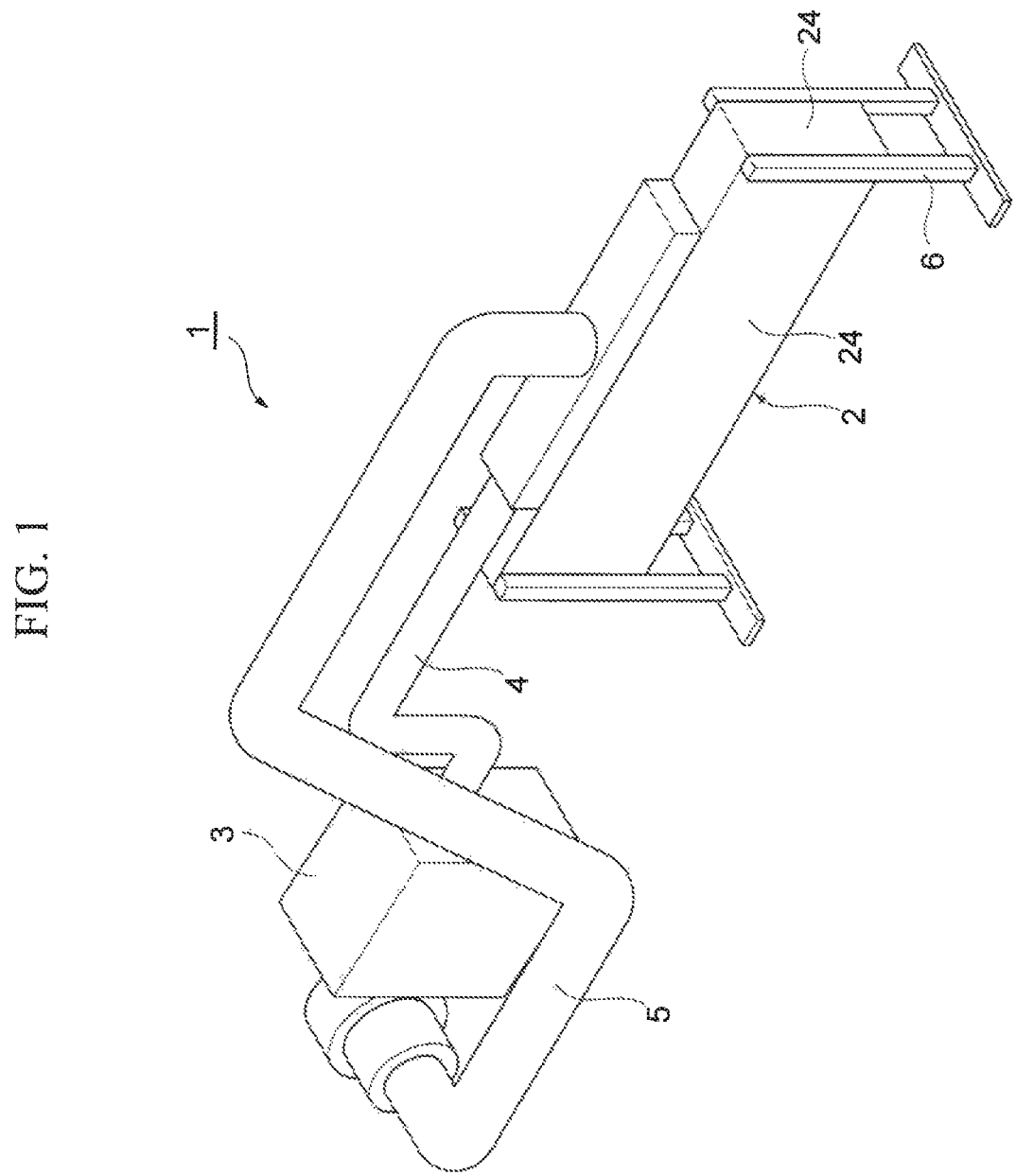
FIG. 1 is a perspective view of a fuel tank producing apparatus according to a first embodiment.

Embodiments of the fuel tank producing apparatus according to the present disclosure will be described below with reference to the drawings. In the illustration of the drawings, the same elements are denoted by the same reference numerals and overlapping descriptions are omitted.

First Embodiment

FIG. 1 is a perspective view of a fuel tank producing apparatus according to a first embodiment. A fuel tank producing apparatus 1 of the present embodiment is used for producing a fuel tank by heating a tank container 10 that includes a fiber-reinforced resin layer containing a thermosetting resin so as to thermally cure the fiber-reinforced resin layer. The fuel tank producing apparatus 1 is securely supported on a mount 6 and includes a heat curing furnace 2 for heating the tank container 10, a hot air generator 3 for generating hot air that is disposed outside the heat curing furnace 2, an intake duct 4 for supplying the heat curing furnace 2 with the hot air generated by the hot air generator 3, and an exhaust duct 5 for returning an exhaust air from the heat curing furnace 2 to the hot air generator 3.

Figure 4:
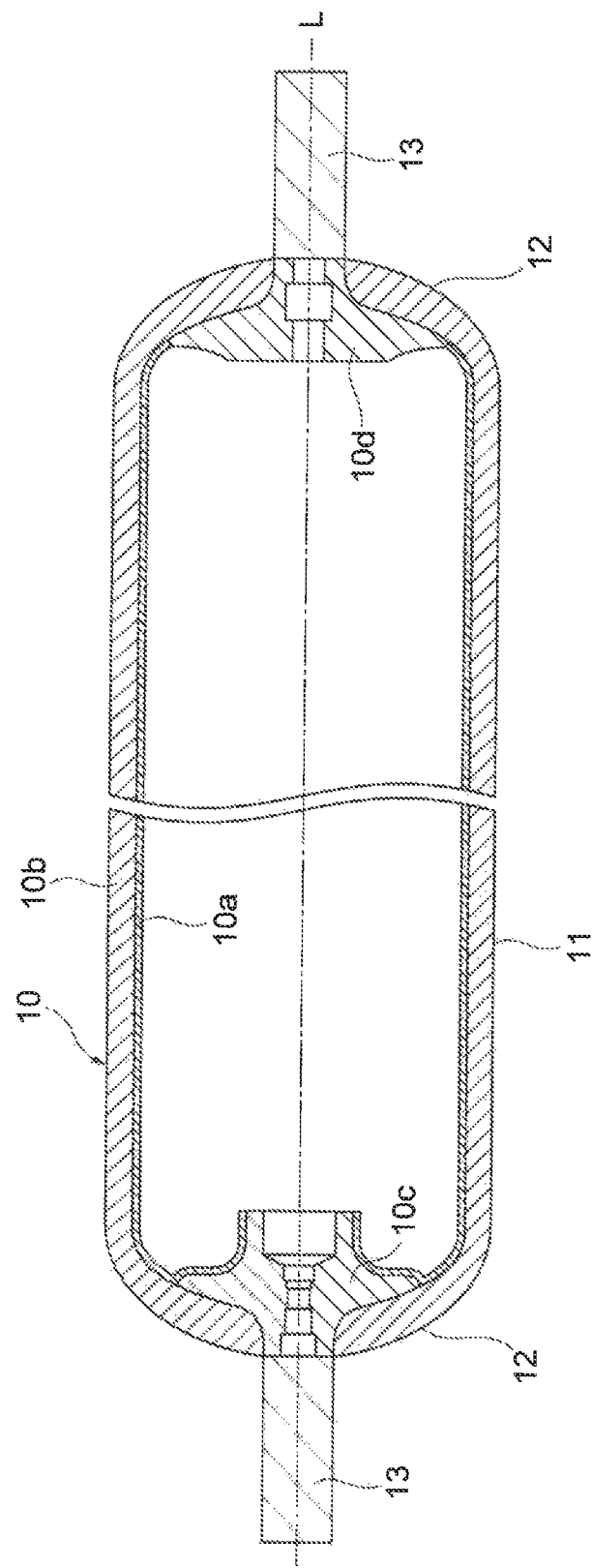
FIG. 4 is a schematic cross-sectional view of the structure of a tank container.

Herein, the structure of the tank container 10 will be described with reference to FIG. 2 and FIG. 4. The tank container 10 is a hollow container that includes a cylindrical body portion 11 with a substantially uniform radius and convex curved dome portions 12 provided at opposite ends of the body portion 11. A metal supported shaft 13 is detachably attached to each of the opposite ends (left and right opposite ends in FIG. 2) in the central axis L direction of the tank container 10. The tank container 10 is driven to rotate about the central axis L thereof by a rotating motor 211 while being rotatably supported, via the supported shafts 13, by bearing members 210 of a rotating portion 21 that will be described later.

The tank container 10 includes a liner 10a that has a storage space for storing fuel therein, a fiber-reinforced resin layer 10b tightly attached to the outer wall of the liner 10a, a valve-side mouthpiece portion 10c, and an end-side mouthpiece portion 10d. The liner 10a is made of a resin material or a light metal material, such as aluminum. The fiber-reinforced resin layer 10b is a reinforcing layer that covers the outer surface of the liner 10a, and is made of reinforcing fibers of a carbon fiber reinforced plastic (CFRP) and the like, to be wound around the outer surface of the liner 10a, and a thermosetting resin for binding the reinforcing fibers together.

The left and right opposite ends in the central axis L direction of the liner 10a and fiber-reinforced resin layer 10b are open, and the valve-side mouthpiece portion 10c and the end-side mouthpiece portion 10d are inserted into one (left side in FIG. 2) and the other (right side in FIG. 2) of the ends, respectively. Further, the valve-side mouthpiece portion 10c and the end-side mouthpiece portion 10d are each detachably coupled to each of the aforementioned supported shafts 13. The valve-side mouthpiece portion 10c and the end-side mouthpiece portion 10d are each made of, for example, a thermally conductive metal member, such as stainless steel and aluminum, or a resin material with a high strength.

Figure 2:
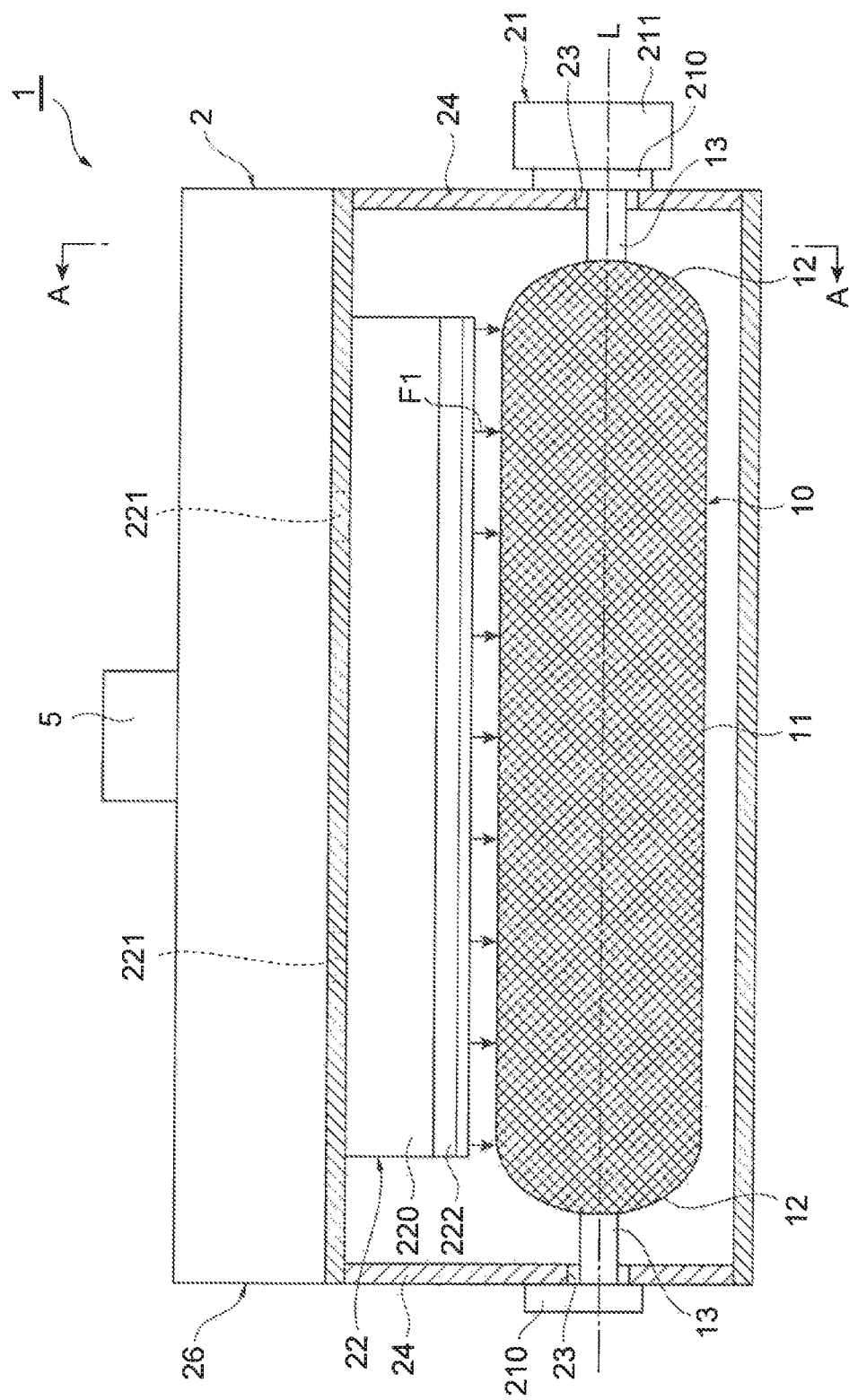
FIG. 2 is a front schematic view of the internal structure of a heat curing furnace.
Figure 3:
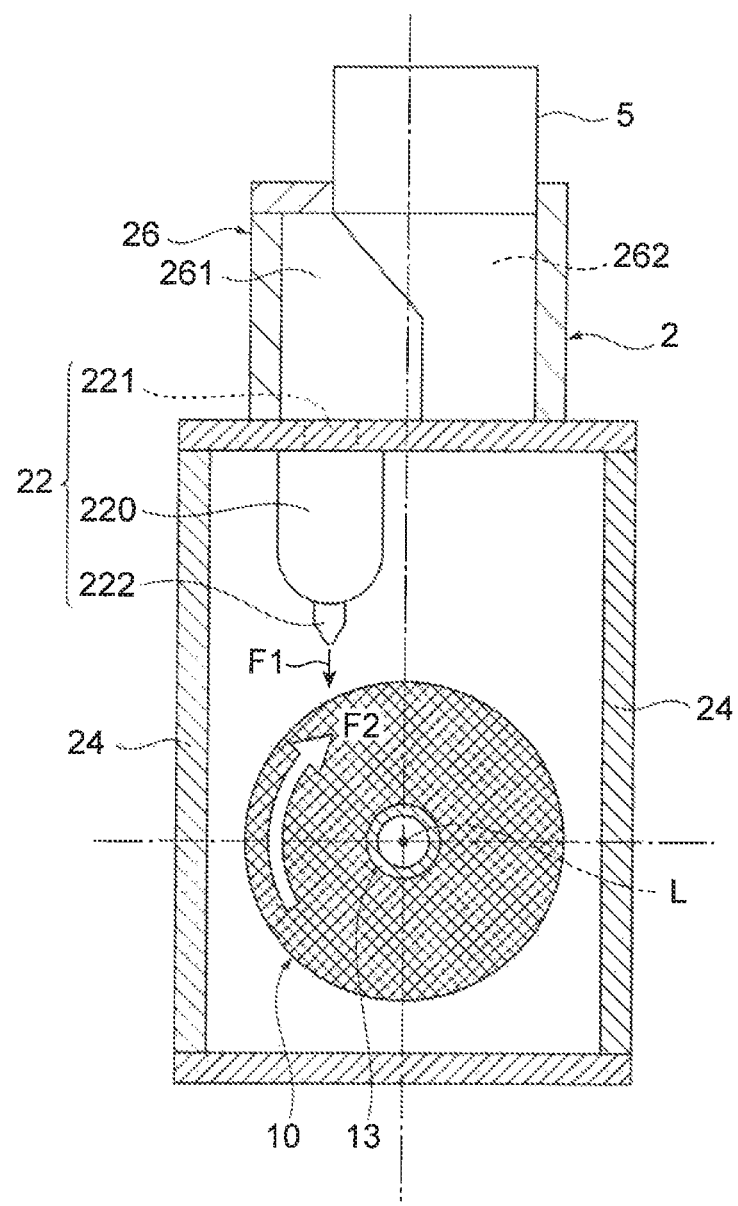
FIG. 3 is a cross-sectional view of the heat curing furnace taken along line A-A of FIG. 2.

FIG. 2 is a front schematic view of the internal structure of the heat curing furnace. FIG. 3 is a cross-sectional view of the heat curing furnace taken along line A-A of FIG. 2. In FIG. 2, for easy understanding of the internal structure, the front side of an furnace wall 24 is omitted.

The heat curing furnace 2 has a space for accommodating the tank container 10 therein and is generally substantially in a box shape. The heat curing furnace 2 is formed such that the furnace wall 24 with heat resistance and a heat retaining property is attached to, for example, a metal frame body so as to surround it from the four sides. The furnace wall 24 is provided with a through hole 23 passing therethrough on each of the left and right sides of the heat curing furnace 2. Further, tip ends of the supported shafts 13 attached to the left and right ends of the tank container 10 are each inserted through the through hole 23 and also securely inserted into the bearing member 210 of the rotating portion 21.

The heat curing furnace 2 is externally provided with the rotating portion 21 for rotating the tank container 10 about the central axis L thereof. The rotating portion 21 includes a pair of bearing members 210 that are fixed to the outside of the furnace wall 24 of the heat curing furnace 2 and that support the aforementioned supported shafts 13, and the rotating motor 211 provided to one side of the pair of bearing members 210. With the rotating portion 21 externally provided to the heat curing furnace 2 in such a manner, the internal space of the heat curing furnace 2 can be reduced, so that the overall size of the heat curing furnace 2 can be reduced. In addition, as compared to a heat curing furnace with a rotating portion internally provided, no heat is absorbed by the rotating portion. Therefore, energy saving can also be achieved.

A heat intake and exhaust box 26 is attached to the ceiling of the heat curing furnace 2. The heat intake and exhaust box 26 is internally provided with an intake passage 261 that allows the intake duct 4 to communicate with a hot air blowing portion 22 that will be described later and an exhaust passage 262 that allows the exhaust duct 5 to communicate with the inside of the heat curing furnace 2 (see FIG. 3).

The hot air blowing portion 22 for blowing hot air onto the surface of the tank container 10 is hung below the heat intake and exhaust box 26. The hot air blowing portion 22 has a flat box shaped hot air rectifying chamber 220 that extends along the central axis L direction of the tank container 10, two connecting tubes 221 provided above the hot air rectifying chamber 220 and connecting the hot air rectifying chamber 220 and the heat intake and exhaust box 26, and an integrally-formed nozzle 222 provided below the hot air rectifying chamber 220 to blow hot air onto the surface of the tank container 10.

The two connecting tubes 221 are disposed at the same intervals from each other along the longitudinal direction (that is, the central axis L direction of the tank container 10) of the hot air rectifying chamber 220. Meanwhile, the integrally-formed nozzle 222 in a slit form extends along the central axis L direction of the tank container 10. The integrally-formed nozzle 222, for example, extends from one end to the other of the body portion 11 and has a structure with a unit injection port as a whole instead of a plurality of separate nozzles connected. Further, the injection port of the nozzle 222 is seamlessly formed along the longitudinal direction (that is, the central axis L direction of the tank container 10) of the body portion 11 of the tank container 10, and blows hot air onto the surface of the body portion 11. With the use of the integrally-formed nozzle 222 as described above, the surface of the body portion 11 can be evenly and uniformly heated. It should be noted that the number of the connecting tubes 221 is not limited to that in the aforementioned description and drawings, but may be changed as appropriate. Further, the nozzle 222 may be provided such that, for example, a plurality of separate nozzles are linearly disposed at the same intervals from each other.

In the present embodiment, the nozzle 222 is located at a position displaced relative to the vertical direction to the central axis L of the tank container 10 as viewed from the central axis L direction of the tank container 10. Specifically, as shown in FIG. 3, the nozzle 222 is located at a position displaced to the left relative to the vertical direction to the central axis L of the tank container 10. In other words, the nozzle 222 is eccentrically positioned to the left side relative to the center of the tank container 10 in the horizontal direction.

Further, in the present embodiment, the rotating portion 21 is configured to rotate the tank container 10 in the reverse direction of the direction in which hot air is blown from the nozzle 222. Specifically, as shown in FIG. 3, since the nozzle 222 is located at a position displaced to the left side relative to the vertical direction to the central axis L of the tank container 10, the hot air blown from the nozzle 222 flows counterclockwise (see an arrow F1) along the surface of the tank container 10. Meanwhile, the tank container 10 is rotated clockwise (see an outline arrow F2) by the rotating portion 21.

In the fuel tank producing apparatus 1 with the aforementioned configuration, since hot air is blown from the nozzle 222 directly onto the surface of the tank container 10 so as to heat the fiber-reinforced resin layer of the tank container 10, the tank container 10 can be heated in a short period of time. Further, since the rotating portion 21 is configured to rotate the tank container 10 in the reverse direction of the direction in which the hot air is blown from the nozzle 222, the hot air blown from the nozzle 222 is dispersed around the tank container 10 so that the tank container 10 maintains its contact with the hot air for a long period of time, thereby improving the thermal efficiency.

Moreover, with the nozzle 222 located at a position displaced to the left side relative to the vertical direction to the central axis L of the tank container 10 as viewed from the central axis L direction of the tank container 10, the hot air blown from the nozzle 222 is allowed to flow in one direction counterclockwise along the tank perimeter, so that the thermal efficiency can be further improved. As a result, the tank container 10 can be uniformly heated in a short period of time and a stable quality in rigidity of the tank container 10 can be obtained.

Further, as compared to conventional fuel tank producing apparatuses that perform heating by the surrounding ambient temperature of the tank container, with such improved thermal efficiency, a high-capacity hot air circulator and rectifying space can be omitted, so that the compact apparatus as a whole can be achieved and the cost can be reduced. Furthermore, through direct heating of the tank container 10 by means of the nozzle 222, the surrounding space of the tank container 10 can be saved, and thus the inside of the heat curing furnace 2 can be downsized.

In addition, according to the heat curing furnace 2 with the aforementioned configuration, a rapid increase in temperature can be addressed, and therefore, in accordance with the resin viscosity that depends on the curing reaction state of the thermosetting resin, such as an epoxy resin with which carbon fibers are impregnated, for example, the temperature profile is minutely set while the speed of rotating the tank container 10 is changed so as to perform temperature control, so that reduction in the time of performing thermal curing and quality in rigidity can be both realized.

Second Embodiment

Figure 5:
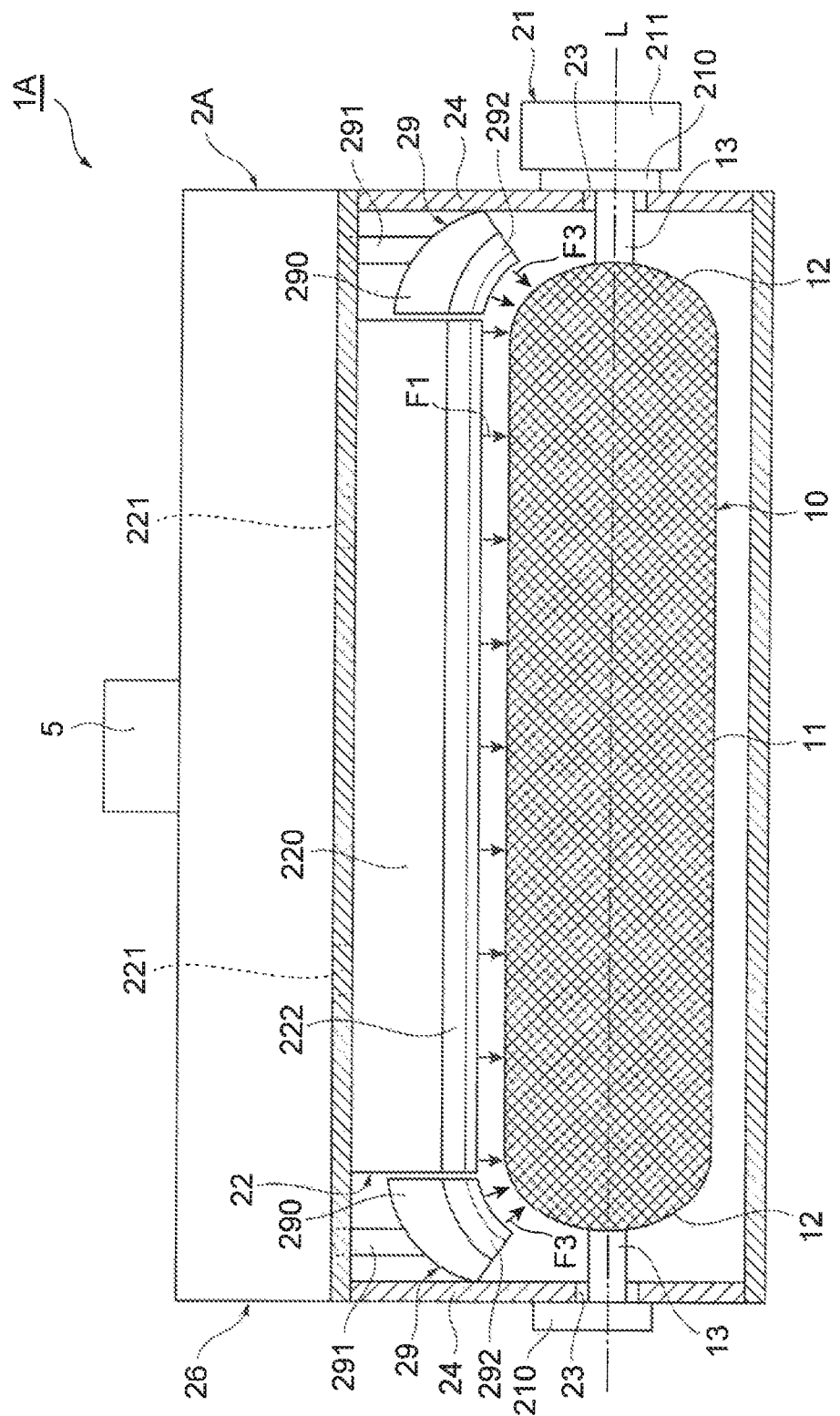
FIG. 5 is a front schematic view of the heat curing furnace of the fuel tank producing apparatus according to a second embodiment.

FIG. 5 is a front schematic view of the heat curing furnace of the fuel tank producing apparatus according to a second embodiment. The structure of a heat curing furnace 2A of the present embodiment is the same as that of the aforementioned first embodiment, except that the heat curing furnace 2A is further provided with a hot air blowing portion 29 for the dome portion that blows hot air onto the dome portion 12 of the tank container 10. Herein, only such a difference therebetween will be described.

As shown in FIG. 5, the left and right opposite sides of the hot air blowing portion 22, which corresponds to the body portion 11 of the tank container 10, are provided with the hot air blowing portions 29 for the dome portions that correspond to the left and right dome portions 12 of the tank container 10. Each of the hot air blowing portions 29 for the dome portions is hung below the heat intake and exhaust box 26 and includes a connecting tube 291 connected to the intake passage 261 of the heat intake and exhaust box 26, a hot air rectifying chamber 290 for rectifying the hot air supplied via the connecting tube 291, and an integrally-formed nozzle 292 that blows the hot air rectified in the hot air rectifying chamber 290 onto the dome portion 12.

The hot air blowing portion 29 for the dome portion is disposed so as to follow the shape of the dome portion 12. More specifically, the integrally-formed nozzle 292 is disposed such that the height from the dome portion 12 and blowing angle thereof are changed so as to follow the convex curved shape of the dome portion 12, so that the hot air is orthogonally blown onto the convex curved surface of the dome portion 12. An injection port of the nozzle 292 is seamlessly formed while it curves along the convex curved shape of the dome portion 12. With the use of the integrally-formed nozzle 292 in this manner, the surface of the dome portion 12 can be evenly and uniformly heated. Further, the hot air rectifying chamber 290 of the hot air blowing portion 29 for the dome portion is formed such that it curves along the convex curved shape of the dome portion 12.

Herein, the temperature or blowing speed of the hot air blown from the nozzle 292 of the hot air blowing portion 29 for the dome portion may be set to be either the same as or different from the temperature or blowing speed of the hot air blown from the nozzle 222 that corresponds to the body portion 11. As shown in FIG. 4, when the fiber-reinforced resin layer 10b of the dome portion 12 is thicker than that of the body portion 11, with the temperature or blowing speed of the hot air blown from the nozzle 292 set higher than the temperature or blowing speed of the hot air blown from the nozzle 222, for example, variation in the thermal curing time due to the difference in thickness is reduced, thereby more easily reducing the time of entirely heating the tank container 10.

With the fuel tank producing apparatus 1A with the aforementioned configuration, the same function and effects as those of the aforementioned first embodiment can be obtained. In addition, since the fuel tank producing apparatus 1A further includes the hot air blowing portions 29 for the dome portions that correspond to the left and right dome portions 12 of the tank container 10, the hot air can also be directly blown onto the surfaces of the dome portions 12 so as to heat them (see arrows F3 in FIG. 5). Through directly heating the dome portions 12 as well as the body portion 11 of the tank container 10 in the aforementioned manner, the tank container 10 can be uniformly heated and the heating time can be further reduced.

Third Embodiment

Figure 6:
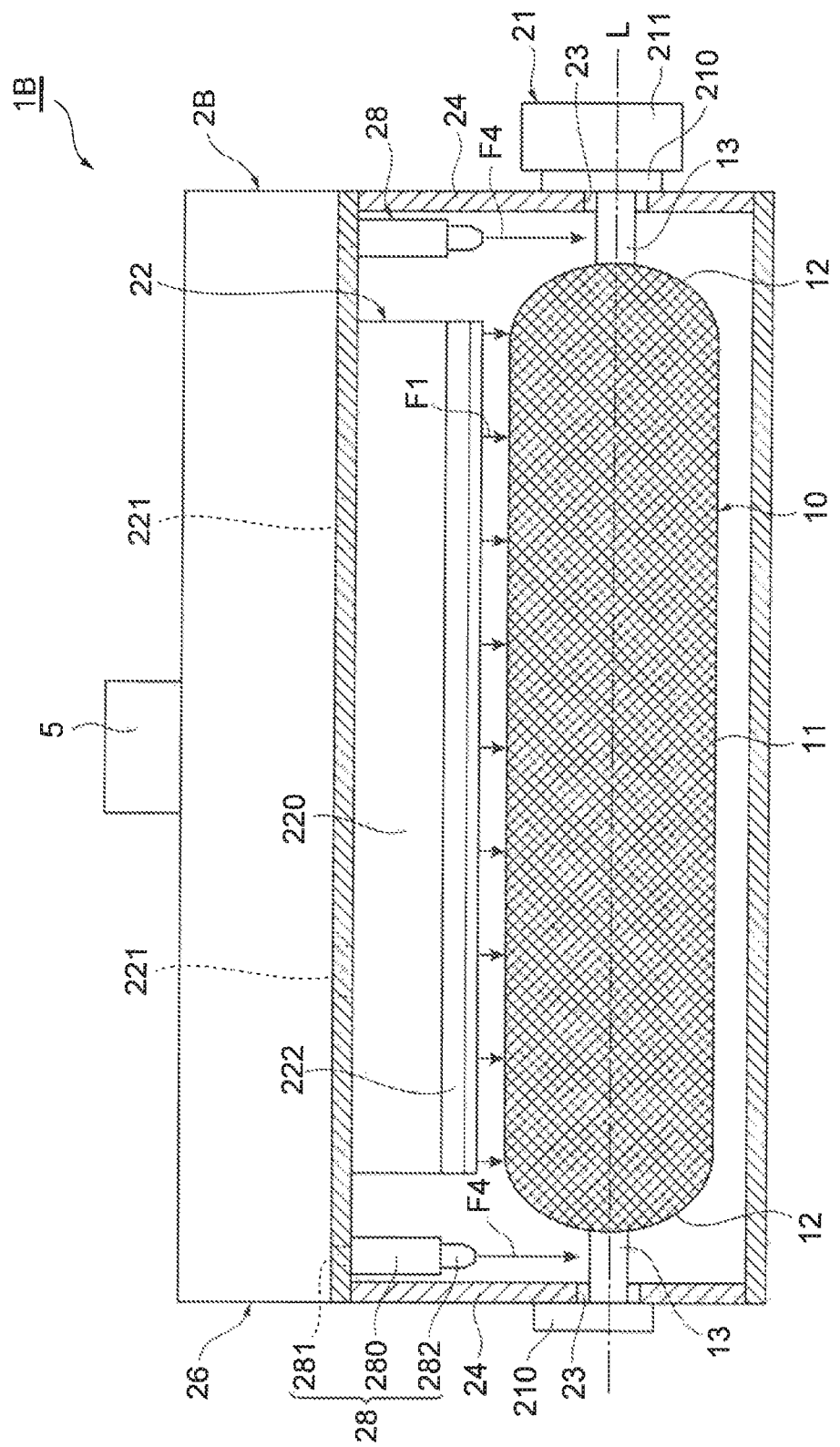
FIG. 6 is a front schematic view of the heat curing furnace of the fuel tank producing apparatus according to a third embodiment.

FIG. 6 is a front schematic view of the heat curing furnace of the fuel tank producing apparatus according to a third embodiment. The structure of a heat curing furnace 2B of the present embodiment is the same as that of the aforementioned first embodiment, except that the heat curing furnace 2B is further provided with a mouthpiece heating portion 28 to heat the mouthpiece portion of the tank container 10. Herein, only such a difference therebetween will be described.

As shown in FIG. 6, the left and right opposite sides of the hot air blowing portion 22 are provided with the mouthpiece heating portions 28 to heat the valve-side mouthpiece portion 10c or end-side mouthpiece portion 10d of the tank container 10 via the supported shafts 13. Each of the mouthpiece heating portions 28 is hung below the heat intake and exhaust box 26 and has a connecting tube 281 connected to the intake passage 261 of the heat intake and exhaust box 26, a hot air rectifying chamber 280 for rectifying the hot air supplied via the connecting tube 281, and a nozzle 282 for blowing the hot air rectified in the hot air rectifying chamber 280 onto the supported shaft 13.

In FIG. 6, the mouthpiece heating portion 28 disposed on the left side of the hot air blowing portion 22 (hereinafter referred to as a left-side mouthpiece heating portion 28) is positioned vertically above the supported shaft 13 attached to the left end of the tank container 10, and heats the valve-side mouthpiece portion 10c via the supported shaft 13. It should be noted that in the present embodiment, the supported shaft 13 is made of a thermally conductive metal member such as stainless steel, and the valve-side mouthpiece portion 10c and end-side mouthpiece portion 10d are both made of aluminum.

Figure 7:
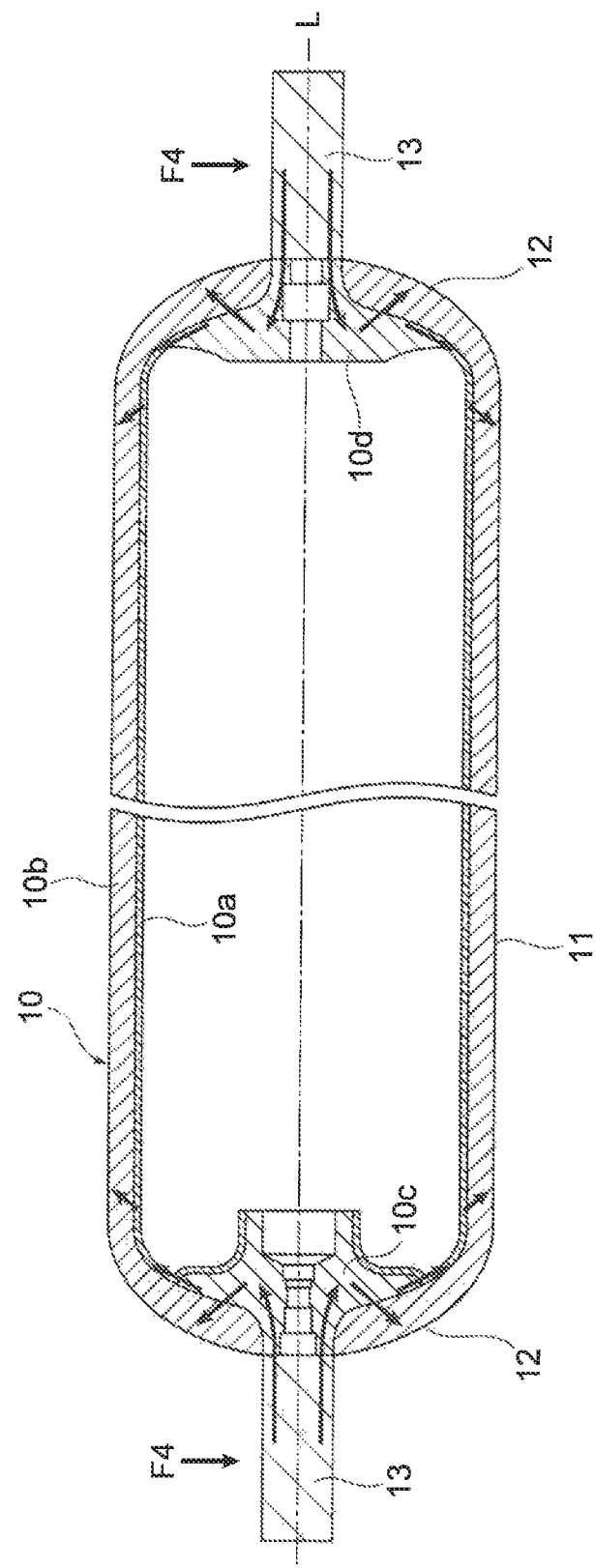
FIG. 7 is a schematic cross-sectional view showing a route of heat transmission inside the tank container.

Further, as indicated by an arrow F4 in FIG. 6 and FIG. 7, some of the heat from the left-side mouthpiece heating portion 28 is transmitted to the fiber-reinforced resin layer 10b on the dome portion 12 side via the supported shaft 13 and valve-side mouthpiece portion 10c, and some to the fiber-reinforced resin layer 10b on the body portion 11 side via the supported shaft 13, valve-side mouthpiece portion 10c, and liner 10a.

Meanwhile, in FIG. 6, the mouthpiece heating portion 28 disposed on the right side of the hot air blowing portion 22 (hereinafter referred to as a right-side mouthpiece heating portion 28) is positioned vertically above the supported shaft 13 attached to the right end of the tank container 10, and heats the end-side mouthpiece portion 10d via the supported shaft 13. As indicated by the arrow F4 in FIG. 6 and FIG. 7, some of the heat from the right-side mouthpiece heating portion 28 is transmitted to the fiber-reinforced resin layer 10b on the dome portion 12 side via the supported shaft 13 and end-side mouthpiece portion 10d, and some to the fiber-reinforced resin layer 10b on the body portion 11 side via the supported shaft 13, end-side mouthpiece portion 10d, and liner 10a.

Herein, the temperature or blowing speed of the hot air blown from the nozzle 282 of the mouthpiece heating portion 28 may be set to be either the same as or different from the temperature or blowing speed of the hot air blown from the nozzle 222 of the hot air blowing portion 22. As shown in FIG. 4 and FIG. 7, when the fiber-reinforced resin layer 10b of the dome portion 12 is thicker than that of the body portion 11, with the temperature or blowing speed of the hot air blown from the nozzle 282 set higher than the temperature or blowing speed of the hot air blown from the nozzle 222, for example, variation in the thermal curing time due to the difference in thickness is reduced, thereby more easily reducing the time of entirely heating the tank container 10.

With the fuel tank producing apparatus 1B with the aforementioned configuration, the same function and effects as those of the aforementioned first embodiment can be obtained. In addition, since the fuel tank producing apparatus 1B further includes the mouthpiece heating portion 28 to heat the mouthpiece portion of the tank container 10, the tank container 10 can also be heated from the inside thereof via the supported shafts 13 and the valve-side mouthpiece portion 10c or the end-side mouthpiece portion 10d. As a result, the time required for heating the tank container 10 can be further reduced.

It should be noted that the mouthpiece heating portion is not limited to the aforementioned one including a nozzle, but may be any heating portion that performs infrared or induction heating or that uses a non-contact heat source, as appropriate.

Although the embodiments of the present disclosure have been described in detail, the present disclosure is not limited thereto, and any design changes are possible without departing from the spirit and scope of the present disclosure described in the claims. For example, in the aforementioned embodiments, the heat curing furnace 2 externally provided with the rotating portion 21 for rotating the tank container 10 has been described as an example, but the rotating portion 21 may be disposed inside the heat curing furnace 2, as appropriate.

Further, in the aforementioned embodiments, the description has been made of an example of the apparatus with the nozzle 222 located at a position displaced to the left side relative to the vertical direction to the central axis L of the tank container 10 as viewed from the central axis L direction of the tank container 10, but the nozzle 222 may be displaced to the right side relative to the vertical direction to the central axis L of the tank container 10. In this case, the hot air blown from the nozzle 222 flows clockwise along the perimeter of the tank container 10, and the rotating portion 21 is thus configured to rotate the tank container 10 counterclockwise.

DESCRIPTION OF SYMBOLS 1, 1A, 1B Fuel tank producing apparatus
2, 2A, 2B Heat curing furnace
3 Hot air generator
4 Intake duct
5 Exhaust duct
10 Tank container
10a Liner
10b Fiber-reinforced resin layer
10c Valve-side mouthpiece portion
10d End-side mouthpiece portion
11 Body portion
12 Dome portion
13 Supported shaft
21 Rotating portion
22 Hot air blowing portion
23 Through hole
24 Furnace wall
26 Heat intake and exhaust box
28 Mouthpiece heating portion
29 Hot air blowing portion for dome portion
210 Bearing member
211 Rotating motor
220, 280, 290 Hot air rectifying chamber
221, 281, 291 Connecting tube
222, 282, 292 Nozzle
L Central axis

What is claimed is:

1. A fuel tank producing apparatus comprising:
   a rotating portion adapted to rotate a tank container about a central axis of the tank container;
   a heated gas intake chamber that receives heated gas from a hot gas generator, the heated gas being capable of curing a thermosetting resin that forms the tank container; and
   a nozzle coupled to the heated gas intake chamber and adapted to blow the heated gas received from the heated gas intake chamber onto a surface of the tank container to cure the thermosetting resin while the tank container is being rotated, wherein
   the rotating portion is configured to rotate the tank container in a reverse direction of a direction of blowing the heated gas from the nozzle so that a portion of the surface onto which the heated gas is blown by the nozzle moves toward the nozzle as the tank container is rotated in the reverse direction, the nozzle is located at a position displaced away from a plane that extends through the central axis of the tank container as viewed from a direction of the central axis of the tank container, and the nozzle blows the heated gas in a blowing direction that (i) is parallel to the plane and (ii) does not intersect the central axis of the tank container.

2. The fuel tank producing apparatus according to claim 1, wherein the nozzle extends along the direction of the central axis of the tank container, and an injection port of the nozzle is seamlessly formed along the direction of the central axis of the tank container.

3. The fuel tank producing apparatus according to claim 1, further comprising a heating portion adapted to heat a mouthpiece portion provided at an end of the tank container in the direction of the central axis of the tank container.

4. A fuel tank producing apparatus comprising:
a rotating portion adapted to rotate a tank container about a central axis of the tank container;
a heated gas intake chamber that receives heated gas from a hot gas generator, the heated gas being capable of curing a thermosetting resin that forms the tank container; and
a nozzle coupled to the heated gas intake chamber and adapted to blow the heated gas received from the heated gas intake chamber onto a surface of the tank container to cure the thermosetting resin while the tank container is being rotated, wherein the nozzle blows the heated gas along a central blowing axis that does not intersect the central axis of the tank container while the tank container is being rotated, and the rotating portion is configured to rotate the tank container in a reverse direction of a direction of blowing the heated gas from the nozzle so that a portion of the surface onto which the heated gas is blown by the nozzle moves toward the nozzle as the tank container is rotated in the reverse direction.

5. The fuel tank producing apparatus according to claim 4, wherein the nozzle extends along the direction of the central axis of the tank container, and an injection port of the nozzle is seamlessly formed along the direction of the central axis of the tank container.

6. The fuel tank producing apparatus according to claim 4, further comprising a heating portion adapted to heat a mouthpiece portion provided at an end of the tank container in the direction of the central axis of the tank container.

7. The fuel tank producing apparatus according to claim 1, wherein the nozzle is positioned to blow the heated gas to a portion of a surface of the tank container that is approximately midway between the central axis of the tank container and an outer periphery of the tank container.

8. The fuel tank producing apparatus according to claim 4, wherein the nozzle is positioned to blow the heated gas to a portion of a surface of the tank container that is approximately midway between the central axis of the tank container and an outer periphery of the tank container.

* * * * *